L. Wood,
Hedge Trimmer.
No. 11400. Patented July 25, 1854.

UNITED STATES PATENT OFFICE.

LEONARD WOODS, OF QUINCY, ILLINOIS.

IMPROVEMENT IN HEDGE-TRIMMERS.

Specification forming part of Letters Patent No. 11,400, dated July 25, 1854.

*To all whom it may concern:*

Be it known that I, LEONARD WOODS, of Quincy, in the county of Adams and State of Illinois, have invented certain new and useful Improvements in Machines for Trimming Hedges; and I do hereby declare that the following is a full, clear, and exact description thereof, reference being had to the accompanying drawings, of which—

Figure 1:
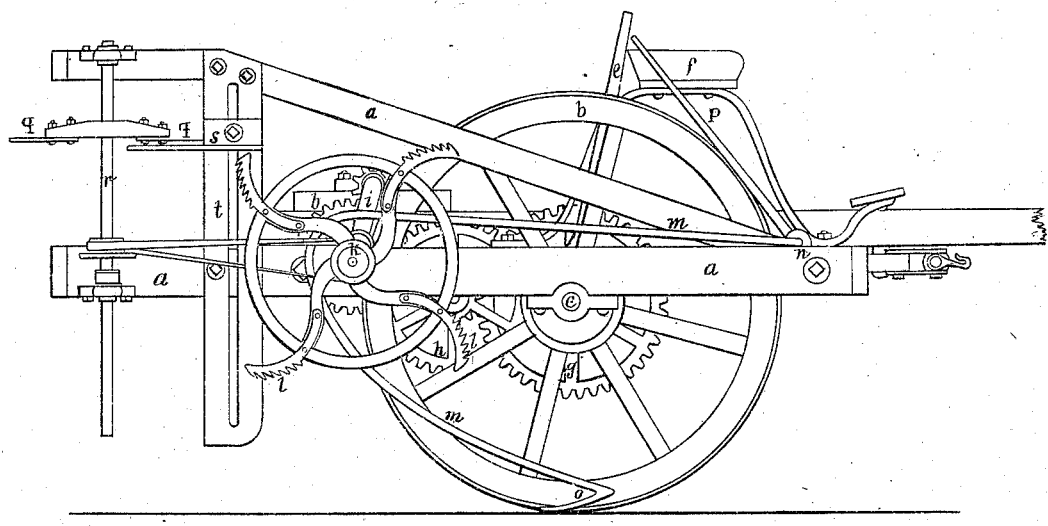
Figure 2:
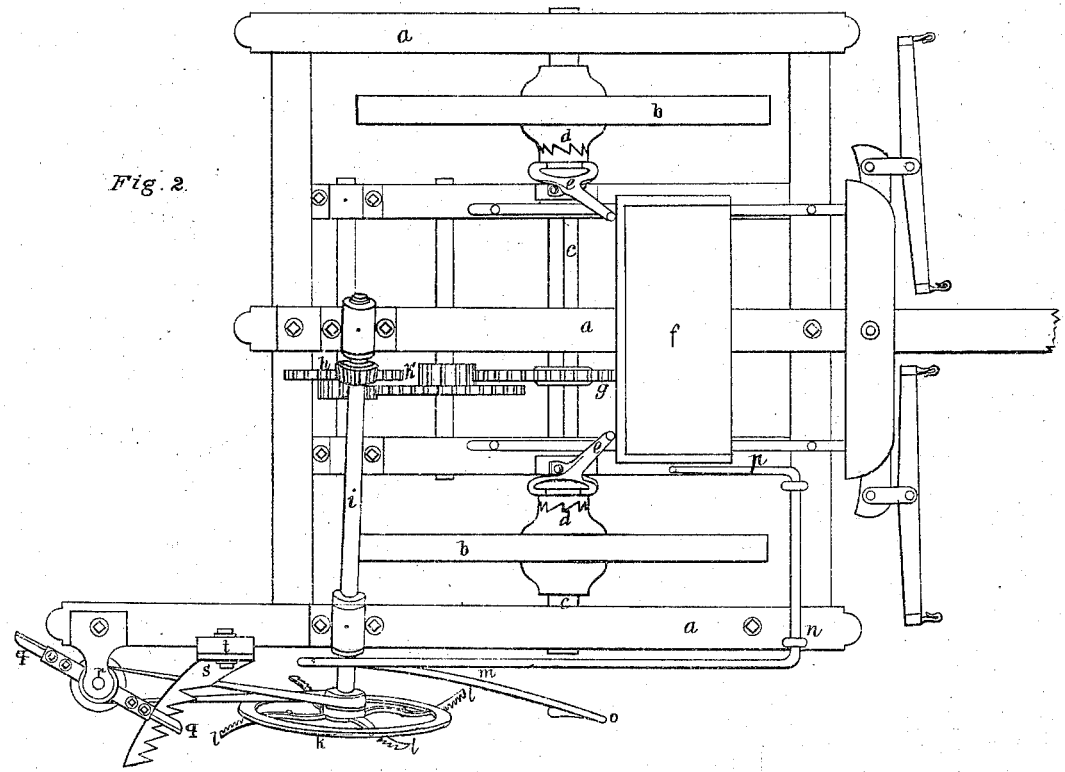

Figure 1 is an elevation of the cutting side, and Fig. 2 a plan of the machine.

The use of hedges in place of other modes of fencing has of late years become so extensive, particularly on the large prairie farms of the western States, that the labor of trimming them has become so considerable as to demand the application of machinery to that purpose. The plant generally employed (the osage-orange) has such a rapid growth as to require cutting several times during the year in order to keep the hedge in proper shape, and to cause it to grow equally close and thick in all parts, and unless some substitute for hand-labor is soon introduced the cultivation of the hedge will have to be discontinued where economy is the principal consideration.

The object of my improvements is to furnish a machine to trim hedges by animal-labor in place of hand-work, which shall perform its duty accurately and uniformly, as well as rapidly, which shall be adaptable to cut the hedge in all stages of its growth, and which shall trim its lowest branches without danger of the knives coming in contact with the ground. My design has been to imitate the stroke of the hedge-bill commonly used by hedge-cutters, with which an upward stroke is made, cutting the twigs from the under side in a slanting direction, in which manner twigs of considerable size can be severed, which it would be wholly impracticable to divide by a cut square across. For the purpose of cutting those branches which lie within a short distance of the ground, I employ an inclined bar, which raises them upward until they come within the range of action of the cutters. Without this appendage the cutters would have to be hung so low that they would be speedily blunted by coming in frequent contact with the ground; or if hung high enough to obviate this difficulty many branches would escape their action altogether. Another advantage gained by the use of the lifter is that a much smaller diameter suffices for the circle in which the cutters move.

In the drawings, $a\ a$ represent the frame of the carriage of the machine, which is furnished with a pole and double-trees for attachment of the horses.

$b\ b$ are the wheels, which run loose on the axle $c$, with which they can be connected, at the pleasure of the driver, by means of coupling-boxes $d\ d$, worked by the levers $e\ e$ at the back of the driver's seat $f$. The coupling-boxes are kept in gear by springs, and having oblique faces, like a ratchet-wheel, they only engage while the machine moves forward, so that in backing the cutting-gear is not affected by the wheels. The axle $c$ runs in boxes in the outside frame-pieces, and has the spur-wheel $g$ fixed on it, by which and suitable intermediate multiplying-gearing, $h$, the cutter-shaft $i$ is driven at a high speed in a direction contrary to that of the wheels $b$.

On the extremity of the shaft $i$ is the cutter-wheel $k$, in the rim of which are fixed the knives $l$. The shaft $i$ is inclined, so that the cutters shall revolve in a plane slightly inclined to the perpendicular, so as to give the proper wedge-shaped form to the side of the hedge. The cutting-knives may be either plane or have a serrated edge, as represented in the drawings.

$m$ is a bent bar, which is suspended to the carriage at $n$. Its extremity $o$ rests on the ground, and is so formed as to run over it without catching, like the tooth of a rake. From the point $o$ to the rear of the revolving cutters it forms an inclined plane, which, acting on the lower branches, lifts them from the ground until, coming within the circle described by the cutters, their ends are cut off and they fall back to their original position. This, it will be seen, allows of a smaller cutter-wheel, with the knives not running nearer than eight or ten inches from the ground, thereby preventing the possibility of their striking it. By means of the lever $p$ the driver can raise the lifting-bar from the ground when desirable.

In the rear of the side cutters are the revolving cutters $q$ for topping the hedge. They are affixed at any required height by a set-screw on the spindle $r$, which runs in bearings in the frame $a$. They are driven by a belt from a pulley on the shaft $i$. As the upper shoots of the hedge must necessarily be cut at right angles to their length, a guard-piece, $s$, is provided, having deeply-indented teeth for detaining and steadying the twigs till cut off, after which the remaining portion slips past. The guard-piece is affixed to a slotted upright piece of the frame $t$, so that it, as well as the cutters, can be set at any desired height for the top of the hedge.

I do not claim the invention of knives revolving on a horizontal shaft, as such have been used in machines for topping cotton; but

What I claim as my invention, and desire to secure by Letters Patent, is—

1. The arrangement of the cutters affixed on the face of a wheel on an inclined shaft revolving so as to cut upward as the carriage is advanced parallel to the side of the hedge, in the manner and for the purpose as described.

2. The gage $s$, in combination with the horizontally-revolving knives $q$, both being adjustable to the required height for topping the hedge, as described.

3. Lifting the lower branches of the hedge to bring them within the range of action of the revolving cutters by means of the bent bar $m$ or its equivalent, thereby obviating the necessity of having the cutter-wheel of large diameter, and allowing the cutters to be carried so high as to be free from all danger of striking the ground, substantially as set forth.

LEONARD WOODS.

Witnesses:
 EDWARD EVERETT,
 PHILO A. GOODWIN.